No. 854,522. PATENTED MAY 21, 1907.
M. F. NEWMAN.
FEEDING DEVICE FOR WATER PURIFYING APPARATUS.
APPLICATION FILED JAN. 11, 1907.
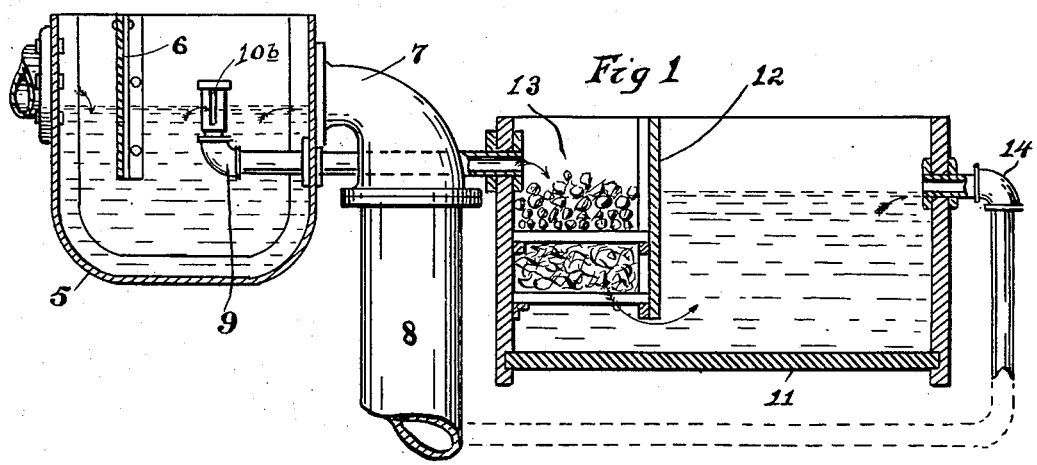
Fig. 1
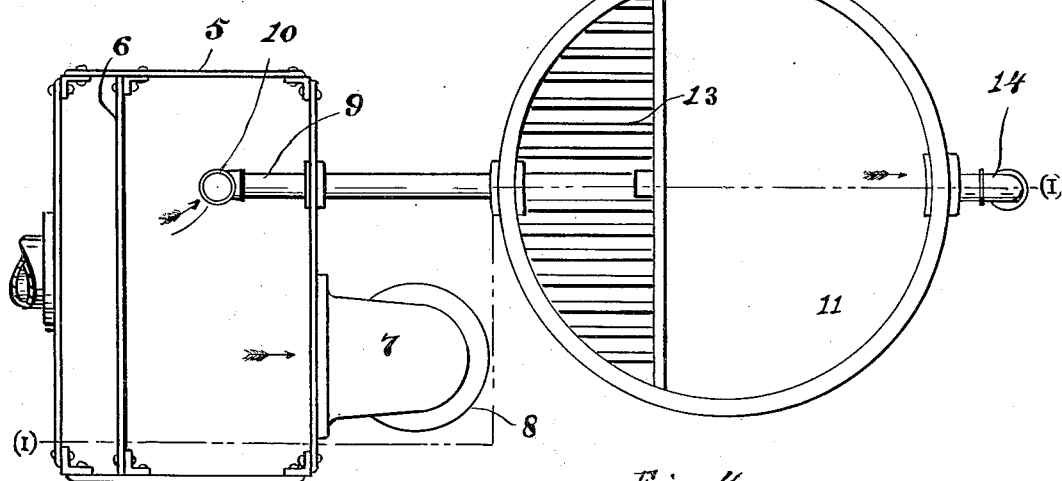
Fig. 2.
Fig. 3.
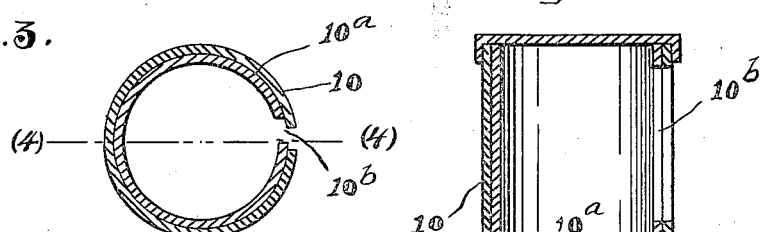
Fig. 4.
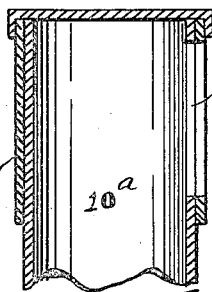
Witness:
Robt F. Dilworth
E. R. Rodd
Inventor,
Martin F. Newman
By F. W. H. Clay
his Atty.

250 # UNITED STATES PATENT OFFICE.

MARTIN F. NEWMAN, OF WILKINSBURG, PENNSYLVANIA, ASSIGNOR TO WM. B. SCAIFE & SONS COMPANY, OF PITTSBURG, PENNSYLVANIA, A CORPORATION OF NEW JERSEY.

FEEDING DEVICE FOR WATER-PURIFYING APPARATUS.

No. 854,522.     Specification of Letters Patent.     Patented May 21, 1907.

Application filed January 11, 1907. Serial No. 351,869.

*To all whom it may concern:*

Be it known that I, MARTIN F. NEWMAN, a citizen of the United States, residing at Wilkinsburg, in the State of Pennsylvania, have invented certain new and useful Improvements in Feeding Devices for Water-Purifying Apparatus, of which the following is a specification.

My invention relates to apparatus for proportionally supplying to a main body of liquid, a chemical solution, as feeding coagulants in water purifying apparatus.

The primary objects of the invention are to displace in the chemical tank a proportion of fluid in fixed ratio to the feed of the raw water, while making it easy to regulate the proportion; to provide an overflow feed regulated by the level in the weir box which feeds the main supply; to provide a rotary regulating outlet for the chemical feed tank, and to generally improve the operation of such apparatus as will hereinafter appear.

In the accompanying drawings, Figure 1 is a vertical section on the line (1), (1) in Fig. 2, and the latter figure is a plan view of the whole apparatus. Figs. 3 and 4 are respectively a horizontal section and a vertical section on line (4), (4) of Fig. 3, of the outlet rotary weir.

Though the invention described is applicable to many other uses, I have illustrated it as applied to water purifying apparatus in which it will be understood that there is added to the water a solution containing a certain proportional amount of the chemical such as a coagulant for removing impurities in the water. It is important in such apparatus to be able to readily adjust the proportion of chemical to the water supply, and also that the proportion when adjusted shall be constant even though the amount of water used may vary.

From the drawings it will appear that there is a receiving tank 5 for the raw water, which is provided with a baffle plate 6 to keep the surface quiet, and it has an outlet pipe whose mouth 7 forms a weir and empties into the pipe 8 leading to the re-action tanks. In the receiving or weir box 5 I place a supplementary pipe 9 which has an upward projecting end 10$^a$ provided with a slot as shown in Figs. 3 and 4 having over it a cylindrical hood 10 with a similar slot, the hood 10 being revoluble on the pipe extension 10$^a$ in order to regulate the width of the slot 10$^b$. The pipe 9 empties into a tank 11 and passes through a box 12 containing a compartment 13 for the chemical and some kind of filter or strainer under the same, and empties by overflow through a pipe 14 from whence the chemical solution is led to some convenient point of mixture with the main supply in pipe 8.

The amount of flow through the weir box 5 and the pipe 8 will of course depend upon the head of water, and likewise the flow outward through the pipe 14 will depend on the level of water in the box 11. The flow into the box 11, which always displaces an equal amount of the chemical, is regulated by the same head of water as regulates the flow through pipe 8, the slot 10$^b$ of the regulating intake being about the same level as the weir of the box 5. At the same time by turning the cap 10 of the pipe 10$^a$ the width of the slot 10$^b$ is regulated and regulates the proportional flow into the chemical box. Thus the flow of the chemical begins when the main flow begins, and ceases when the latter stops, and at whatever level the water may be in the feed tank 5, the amount of water discharged into tank 11 to displace the chemical, is in the same proportion, as this has been determined by regulating the opening of the outlet 10$^a$.

Various other advantages of the device will readily occur to those familiar with the art.

Having thus described my invention and illustrated its use what I claim as new and desire to secure by Letters Patent is the following.

1. A chemical feed apparatus comprising a solution tank and outlet, a tank feeding a main supply of liquid by overflow, and an adjustable weir intake for the solution tank placed inside the main feed tank, whereby the amount of liquid fed to the solution tank is always proportional to the main flow.

2. The combination with a feed tank having an overflow outlet, a chemical solution tank having an overflow outlet, and a pipe feeding the solution tank from the liquid in the feed tank having a weir intake, substantially as described.

3. The combination with a water feed tank having an overflow outlet, of a supplementary overflow outlet therein provided with an adjustable weir, a chemical solution tank supplied by the latter, and having an overflow outlet with connections to join the main flow of water, substantially as described.

4. In a chemical feeding device the combination with a solution tank having an overflow outlet, a main supply tank, and a supplementary weir outlet from the same to the solution tank, said weir being adjustable in capacity without changing the level of the outflow.

5. The combination with a supply tank, and a solution tank each emptying by overflow, of a weir pipe from the supply tank to the solution tank having a vertical inlet slot and a shutter device for regulating the width of said slot, substantially as described.

6. In water purifying apparatus an intake weir comprising a vertical pipe having a vertical slot, and a slotted sheath on said pipe rotatable thereon for regulating the width of said intake slot, substantially as described.

In testimony whereof I have hereunto signed my name in the presence of the two subscribed witnesses.

MARTIN F. NEWMAN.

In presence of—
   F. W. H. CLAY,
   CHAS. S. LEPLEY.